United States Patent Office 3,135,353
Patented June 2, 1964

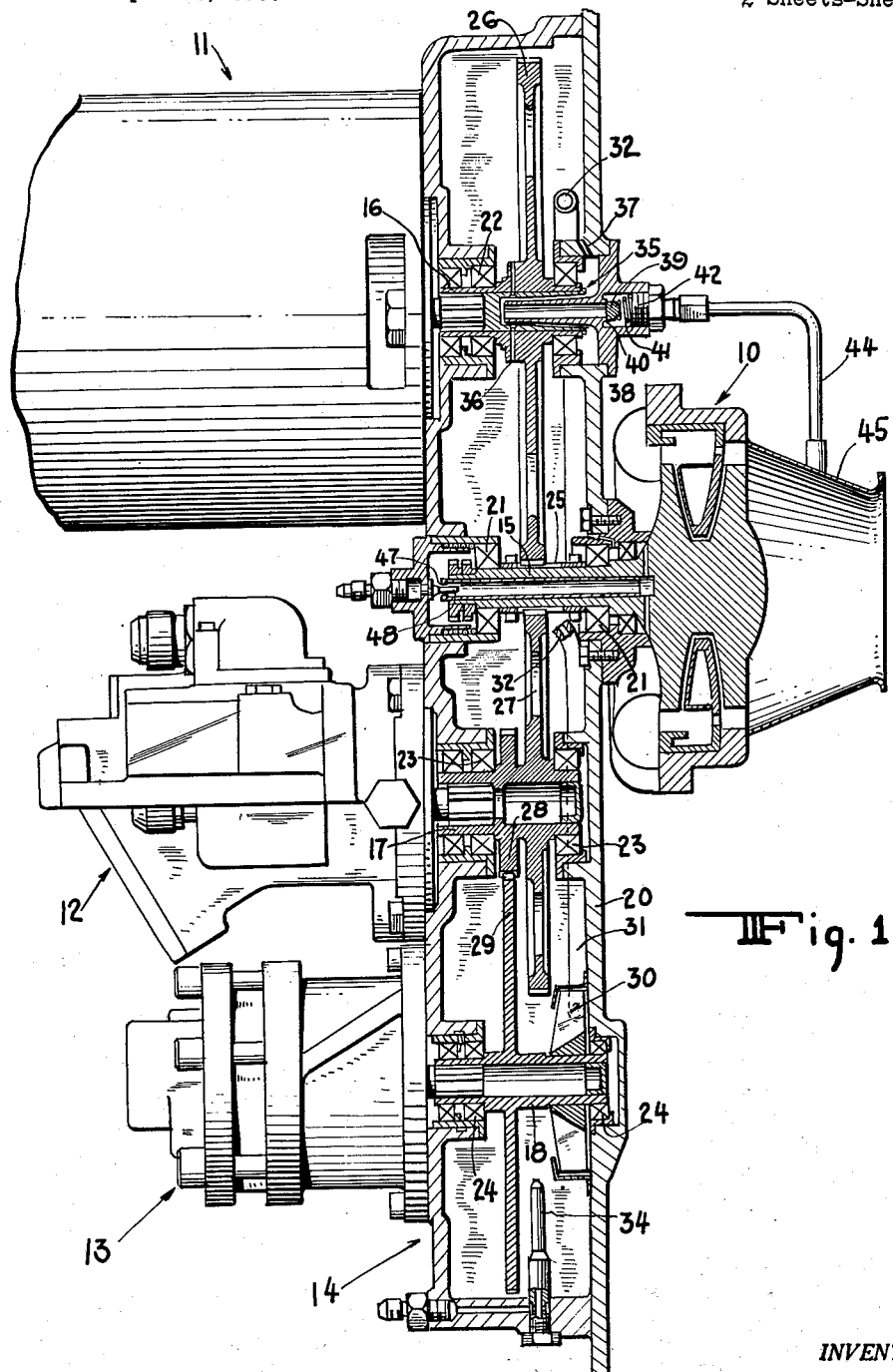

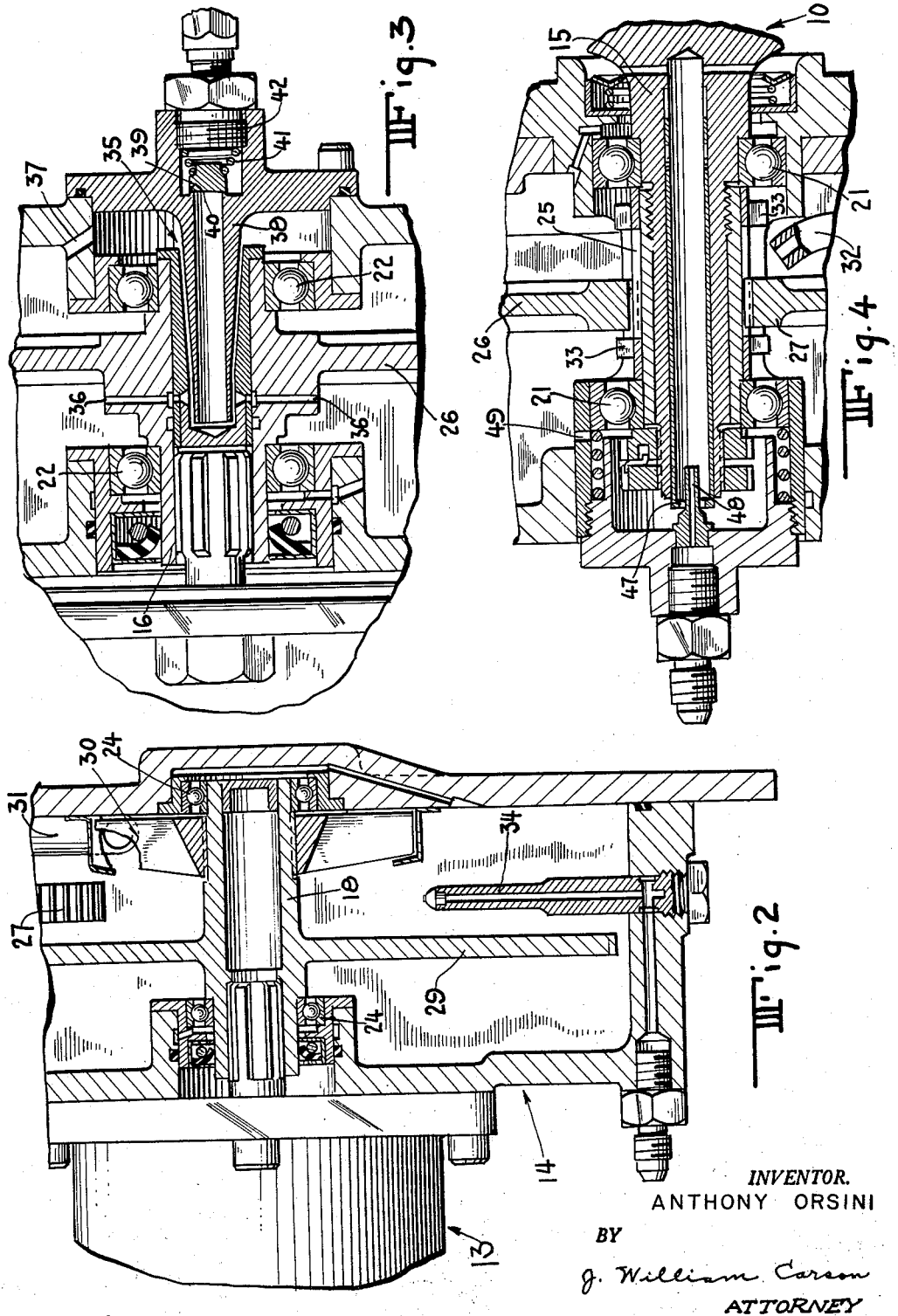

3,135,353
LUBRICATING AND COOLING SYSTEM
Anthony Orsini, Wyckoff, N.J., assignor to Specialties Development Corporation, Belleville, N.J., a corporation of New Jersey
Filed Sept. 29, 1960, Ser. No. 59,283
8 Claims. (Cl. 184—6)

The present invention relates to lubricating and/or cooling systems, and, more particularly, to a system for lubricating bearings or other moving parts under conditions where the lubricant and/or coolant cannot be depended upon to flow by gravity, for example, in a power plant for a space missile which requires lubrication and/or cooling when the missile is in outer space where the effect of gravity is practically nil.

Such power plants usually include an electrical generator or alternator, a pump for hydraulic fluid and a fuel pump which are driven by a hot gas operated turbine through a gear box including shafts, gears and bearings which require lubrication and/or cooling. Such a gear box cannot be lubricated and/or cooled in the conventional manner, for example, by pumping the lubricant and/or coolant from a reservoir and returning the same to the reservoir because the position of the reservoir is unpredictable and there is no gravity flow at zero or nearly zero gravity conditions.

Accordingly, an object of the present invention is to provide a system for lubricating and/or cooling parts under conditions where the effect of gravity is practically nil.

Another object is to provide such a system which is readily embodied in existing and newly constructed power plants which utilize a gear box or the like.

A further object is to provide such a system which is simple, practical and economical is reliable in operation.

Other and further objects of the invention will be obvious upon and understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompaying drawings, forming a part of the specification, wherein:

FIG. 1 is a longitudinal sectional view of a gear box driven by a hot gas turbine for driving an alternator, and hydraulic fluid and fuel pumps which gear box is equipped wth a lubricating and cooling system in accordance with the present invention.

FIG. 2 is a fragmentary enlarged sectional view of fan means and coolant injection means.

FIG. 3 is a fragmentary enlarged sectional view of means for separating spent coolant from the lubricant.

FIG. 4 is a fragmentary enlarged sectional view of auxiliary coolant injection means.

Referring to the drawings in detail, there is shown a power plant adapted for use in a space missile or the like and elsewhere which power plant generally comprises drive means such as a gas operated turbine 10, an electrical generator or alternator 11, a rotary hydraulic fluid pump 12, a rotary fuel pump 13, and a gear box 14 having an input shaft 15 driven by the turbine and having output shafts 16, 17 and 18 for respectively driving the generator 11 and the pumps 12 and 13.

The gear box 14 comprises an elongate, fluid tight casing 20 adapted to contain a liquid lubricant; vertically spaced pairs of bearings 21, 22, 23 and 24 within the casing having the shafts 15, 16, 17 and 18, respectively, journalled therein for rotation; and intermeshing gears including a gear 25 on the drive shaft 15 for driving a gear 26 on the shaft 16 and a gear 27 on the shaft 17, and a gear 28 on the shaft 17 for driving a gear 29 on the shaft 18.

With this arrangement, the lubricant which is free to move about in the casing will contact at least one of the gears 25 to 29 regardless of the position of the casing, and the lubricant will be thrown from the gears by centrifugal action to form a mist which can be distributed throughout the casing and can be directed onto the bearings and meshing teeth of the gears to lubricate the same.

In accordance with the present invention, the foregoing can be accomplished by providing fan means such as a blower 30 mounted on one of the shafts and adjacent the teeth of one of the gears. For example, as shown herein the blower 30 may be on the shaft 18 and adjacent the teeth of the gear 27 (FIG. 2). The mist or dispersion of lubricant can then be directed by the blower into a conduit 31 which conducts the lubricant and has outlets 32 adjacent the bearings 21 and 22. If desired similar conduits could be provided for conducting the lubricant to the bearings 23 and 24, but in the arrangement shown these bearings are sufficiently close to the blower to be lubricated by the turbulent zone of lubricant created by the blower. If desired, fan blades 33 may be provided on the shaft 15 for directing the mist or dispersion of lubricant into the bearings 21 (FIG. 4).

In certain power plant, the cooling of bearings and other parts is desirable with or without lubrication. This is accomplished by injecting a liquid vaporizable coolant such as water by means of a nozzle 34 into the casing, preferably adjacent the blower 30. This spray is dispersed with or without the lubricant and is conducted to the bearings by the conduit 31 and by the turbulent zone created by the blower (FIG. 2). Cooling action is obtained by vaporization of the liquid coolant to its gaseous state, whereby the latent heat required to effect vaporization removes heat from the parts in the casing.

When both lubrication and cooling are provided, a mist of lubricant and coolant is created, and the spent gaseous coolant is separated from the lubricant by a centrifugal separator 35 operated by the shaft 16 (FIG. 3). The mixture of liquid lubricant and gaseous coolant enters the separator through openings 36 and the centrifugally separated lubricant is returned to the casing proper by an opening 37. The separated coolant is discharged from the casing through an outlet tube 38 preferably provided with a check valve including a valve member 39, a seat 40 and a spring 41 for normally holding the valve member on its seat to seal the casing outlet tube but adapted to yield to the pressure of the vaporized coolant. By placing the check valve in a chamber 42 having one end of a conduit 44 connected thereto, and providing the turbine exhaust with a shroud 45 to which the other end of the conduit 44 is connected, the vaporized coolant is carried away with the exhaust gases of the turbine.

Since the turbine shaft 15 and its bearings 21 become considerably hotter than the other shafts and bearings because of heat transfer by conduction from the turbine, auxiliary cooling means are provided. This is accomplished by using a hollow shaft 15 (FIG. 4) having an open end 47, and injecting a liquid vaporizable coolant such as water into the open end by a nozzle 48 extending into the shaft whereby the water is converted to steam. This steam passes through an opening 49 into the casing and is ejected by the separator 35 together with the spent coolant introduced into the casing by the nozzle 34.

It will of course be understood that the coolant need not be supplied constantly but only when required. This can be accomplished by suitably located thermostats for controlling valves in the coolant supply pipe.

From the foregoing description, it will be seen that the present invention provides a practical and reliable lubricating and/or cooling system which functions in the absence of the effect of gravity.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a system for cooling and lubricating parts under conditions where the coolant and lubricant cannot be depended upon to flow by gravity, the combination of a casing adapted to contain a liquid lubricant, a plurality of shafts in said casing, a plurality of bearings in said casing for mounting said shafts for rotation, drive means for effecting rotation of one of said shafts, intermeshing gear means on said shafts for effecting rotation of the other of said shafts, means for injecting a liquid coolant into said casing, fan means on one of said shafts adjacent said injecting means for distributing lubricant and coolant within said casing, the coolant being vaporized by heat within said casing, and means driven by one of said shafts for separating the gaseous coolant and the lubricant and discharging the separated coolant from said casing and returning the lubricant to said casing.

2. In a system for cooling and lubricating parts under conditions where the coolant and lubricant cannot be depended upon to flow by gravity, the combination of a casing adapted to contain a liquid lubricant, a plurality of shafts in said casing, a plurality of bearings in said casing for mounting said shafts for rotation, drive means for effecting rotation of one of said shafts, intermeshing gear means on said shafts for effecting rotation of the other of said shafts, means for injecting a liquid coolant into said casing, fan means on one of said shafts adjacent said injecting means for distributing lubricant and coolant within said casing, conduit means for directing lubricant and coolant from said fan means to certain locations in said casing, the coolant being vaporized by heat within said casing and means driven by one of said shafts for separating the gaseous coolant and the lubricant and discharging the separated spent coolant from said casing.

3. In a system for cooling parts under conditions where the coolant cannot be depended upon to flow by gravity, the combination of a casing, a plurality of shafts in said casing, a plurality of bearings in said casing for mounting said shafts for rotation, a hot gas operated motor for effecting rotation of one of said shafts, said last mentioned shaft being hollow, intermeshing gear means on said shafts for effecting rotation of the other of said shafts, means for injecting liquid vaporizable coolant into said casing, fan means on one of said shafts adjacent said injecting means for distributing the coolant within said casing, means for injecting liquid vaporizable coolant in said hollow shaft and discharging vaporized coolant into said casing, and means for discharging vaporized coolant from said casing.

4. In a system for lubricating parts under conditions where the lubricant cannot be depended upon to flow by gravity, the combination of a casing adapted to contain a liquid lubricant, first, second, third and fourth shafts spaced apart in said casing, a plurality of bearings in said casing for mounting said shafts for rotation, drive means for effecting rotation of said second shaft, intermeshing gear means on said shafts for effecting rotation of the other of said shafts, means for injecting liquid vaporizable coolant into said casing adjacent said fourth shaft, fan means on said fourth shaft for impelling and distributing the lubricant and coolant to be intermingled and dispersed in said casing, conduit means for directing the mist to the bearings of said first and second shafts, and means driven by said first shaft for separating the lubricant from vaporized coolant and discharging the latter from said casing.

5. In a system for lubricating parts under conditions where the lubricant cannot be depended upon to flow by gravity, the combination of a casing adapted to contain a liquid lubricant, first, second, third and fourth shafts spaced apart in said casing, said second shaft being hollow, a plurality of bearings in said casing for mounting said shafts for rotation, a hot gas operated motor for effecting rotation of said second shaft, intermeshing gear means on said shafts for effecting rotation of the other of said shafts, means for injecting a liquid vaporizable coolant into said casing adjacent said fourth shaft, fan means on said fourth shaft for impelling and distributing the lubricant and coolant to be intermingled and dispersed in said casing, conduit means for directing the mist to the bearings of said first and second shafts, means for injecting liquid vaporizable coolant into said hollow second shaft and discharging vaporized coolant into said casing, and means driven by said first shaft for separating the lubricant and coolant and returning the separated lubricant to said casing.

6. In a system for lubricating parts under conditions where the lubricant cannot be depended upon to flow by gravity, the combination of a casing adapted to contain lubricant, a plurality of shafts in said casing, plurality of bearings in said casing for mounting said shaft for rotation, means for driving one of said shafts, gear means interconnecting said shafts to be driven by said last mentioned shaft, means adjacent one end of said casing for injecting a liquid vaporizable coolant therein, means operated by one of said shafts for impelling and distributing the lubricant and coolant to be intermingled and dispersed in said casing to lubricate and cool said bearings, and means operated by one of said shafts adjacent the other end of said casing for separating vaporized coolant and lubricant having outlet means for discharging the separated coolant from said casing.

7. In a system for lubricating parts under conditions where the lubricant cannot be depended upon to flow by gravity, the combination of a casing adapted to contain lubricant, a plurality of shafts in said casing, a plurality of bearings in said casing for mounting said shaft for rotation, means for driving one of said shafts, gear means interconnecting said shafts to be driven by said last mentioned shaft, means adjacent one end of said casing for injecting a liquid vaporizable coolant therein, means operated by one of said shafts for impelling and distributing the lubricant and coolant to be intermingled and dispersed in said casing to lubricate and cool said bearings, and means operated by one of said shafts adjacent the other end of said casing for separating vaporized coolant and lubricant having outlet means for discharging the separated coolant from said casing, said outlet means having a check valve therein constructed and arranged to be unseated by pressure of the vaporized coolant within said casing.

8. In a system for lubricating and cooling parts under conditions where the effect of gravity is practically nil, the combination of a casing adapted to contain a liquid lubricant, moving parts in said casing to be cooled and lubricated, fan means in said casing for dispersing the lubricant within said casing, means for injecting a liquid vaporizable coolant adjacent said fan means to cause the coolant to be intermingled and dispersed with the lubricant within said casing, and means for separating the spent vaporized coolant and the lubricant, discharging the separated coolant from said casing and returning the separated lubricant to said casing.

References Cited in the file of this patent

UNITED STATES PATENTS

| | | |
|---|---|---|
| 2,214,485 | Short | Sept. 10, 1940 |
| 2,417,747 | Flowers | Mar. 18, 1947 |
| 2,664,173 | Karig | Dec. 29, 1953 |
| 2,709,567 | Wood | May 31, 1955 |
| 2,845,141 | Mauck et al. | July 29, 1958 |
| 2,857,019 | Almasi | Oct. 21, 1958 |
| 2,961,550 | Dittman | Nov. 22, 1960 |
| 2,995,211 | Cohen | Aug. 8, 1961 |